United States Patent
Hayakawa et al.

(10) Patent No.: US 9,343,721 B2
(45) Date of Patent: May 17, 2016

(54) SEPARATOR FOR NON-AQUEOUS BATTERIES AND NON-AQUEOUS BATTERY EQUIPPED WITH SAME, AND PROCESS FOR MANUFACTURING SEPARATOR FOR NON-AQUEOUS BATTERIES

(75) Inventors: Tomohiro Hayakawa, Okayama (JP); Takayoshi Hosoya, Fujisawa (JP); Hiroyuki Kawai, Okayama (JP); Hideo Hayashi, Okayama (JP); Yutaka Hayashi, Nomi (JP); Kohsuke Togashi, Nomi (JP); Naotaka Gotoh, Takaishi (JP)

(73) Assignee: KURARAY CO., LTD., Kurashiki-shi (JP)

( * ) Notice: Subject to any disclaimer, the term of this patent is extended or adjusted under 35 U.S.C. 154(b) by 603 days.

(21) Appl. No.: 13/881,747

(22) PCT Filed: Oct. 13, 2011

(86) PCT No.: PCT/JP2011/073502
§ 371 (c)(1),
(2), (4) Date: Apr. 26, 2013

(87) PCT Pub. No.: WO2012/056890
PCT Pub. Date: May 3, 2012

(65) Prior Publication Data
US 2013/0224557 A1    Aug. 29, 2013

(30) Foreign Application Priority Data
Oct. 27, 2010    (JP) ................. 2010-240329

(51) Int. Cl.
| | | |
|---|---|---|
| *H01M 2/16* | (2006.01) | |
| *C08G 18/04* | (2006.01) | |
| *C08G 18/40* | (2006.01) | |
| *H01M 10/052* | (2010.01) | |

(52) U.S. Cl.
CPC ............ *H01M 2/1653* (2013.01); *C08G 18/04* (2013.01); *C08G 18/4009* (2013.01); *H01M 2/162* (2013.01); *H01M 2/1666* (2013.01); *H01M 2/1686* (2013.01); *H01M 10/052* (2013.01); *Y02E 60/122* (2013.01); *Y02P 70/54* (2015.11)

(58) Field of Classification Search
CPC ... C08G 18/04; C08G 18/4009; H01M 2/162; H01M 2/1666; H01M 2/1686
USPC .................................................. 429/129, 144
See application file for complete search history.

(56) References Cited

U.S. PATENT DOCUMENTS

| | | | |
|---|---|---|---|
| 8,465,861 B2 | 6/2013 | Yamamoto et al. | |
| 2002/0061449 A1 | 5/2002 | Maruo et al. | |
| 2004/0234865 A1 | 11/2004 | Sato et al. | |
| 2006/0122356 A1* | 6/2006 | Hamasaki ......... | C08G 18/4018 528/44 |
| 2009/0191448 A1 | 7/2009 | Yamamoto et al. | |

FOREIGN PATENT DOCUMENTS

| | | |
|---|---|---|
| CN | 1360357 A | 7/2002 |
| CN | 101692503 A | 4/2010 |
| JP | 5 226002 | 9/1993 |
| JP | 2004 31084 | 1/2004 |
| JP | 2004 55509 | 2/2004 |
| JP | 2006 19191 | 1/2006 |
| JP | 2009 224100 | 10/2009 |
| JP | 2011 46761 | 3/2011 |

OTHER PUBLICATIONS

Chinese Office Action issued Oct. 10, 2014, in China Patent Application 201180051499.3 (with Partial English translation).
International Search Report Issued Jan. 10, 2012 in PCT/JP11/73502 Filed Oct. 13, 2011.

* cited by examiner

*Primary Examiner* — Ladan Mohaddes
(74) *Attorney, Agent, or Firm* — Oblon, McClelland, Maier & Neustadt, L.L.P.

(57) ABSTRACT

Provided is a separator for non-aqueous batteries, capable of being usefully used in non-aqueous batteries, and a non-aqueous battery equipped with this separator. The separator for non-aqueous batteries includes: a base layer comprising a fiber aggregate, and an electrolyte-swellable resin layer formed on at least one surface of the base layer, the resin layer comprising a urethane resin (C) obtained by reacting a polyol (A) including a vinyl polymer (a1) and a polyether polyol (a2) with a polyisocyanate (B). The vinyl polymer (a1) has as a main chain a vinyl polymer (a1') having two hydroxyl groups at one of the termini of the main chain, and a polyoxyethylene chain having a number average molecular weight of 200 to 800 as a side chain, the percentage of the polyoxyethylene chain based on the vinyl polymer (a1) being within the range of 70 mass % to 98 mass %.

14 Claims, No Drawings

SEPARATOR FOR NON-AQUEOUS BATTERIES AND NON-AQUEOUS BATTERY EQUIPPED WITH SAME, AND PROCESS FOR MANUFACTURING SEPARATOR FOR NON-AQUEOUS BATTERIES

CROSS REFERENCE TO THE RELATED APPLICATION

This application is a National Phase of PCT/JP2011/073502 filed on Oct. 13, 2011. This application is based on and claims priority to Japanese patent application No. 2010-240329, filed Oct. 27, 2010, the entire disclosure of which is herein incorporated by reference as a part of this application.

FIELD OF THE INVENTION

The present invention relates to a separator for batteries useful as a component material for non-aqueous batteries and to a non-aqueous battery equipped with the same, and further relates to a process for manufacturing the separator for batteries.

BACKGROUND ART

Recently, in order to adapt to cordless electrical and electric apparatuses, non-aqueous batteries, such as lithium batteries (lithium primary batteries) and lithium-ion secondary batteries, have attracted attention as a lightweight power source from which high electromotive force and high energy can be obtained. For example, cylindrical-type lithium secondary batteries and others have been produced in large numbers to be used in cellular phones, laptop computers, and the like, and production volume thereof has been increasing year by year. Furthermore, such non-aqueous batteries have also attracted attention as an energy source for next-generation electric vehicles. There also is increasing demand for higher output achieved by further suppressing electric resistance.

As a currently used separator for non-aqueous batteries, there is a porous film formed from a polyolefin made to have fine pores through drawing. However, since the polymer itself is not swellable with liquid electrolyte, only a separator having high resistance can be obtained therefrom. Such a separator cannot satisfy the demand for higher output.

Thus, Patent Document 1 (JP Laid-open Patent Publication No. H5-226002) discloses a gel electrolyte for lithium secondary batteries using an ether-based polyurethane, $LiAF_6$, and propylene carbonate as principal components.

The above invention can provide a lithium secondary battery that can have an interfacial impedance as high as that of liquid electrolyte, by improving contact between the electrodes and the electrolyte.

Further, Patent Document 2 (JP Laid-open Patent Publication No. 2004-31084) discloses a separator for non-aqueous batteries comprising a polymer resin coating layer having fine pores on one surface of its base material.

This document enables to provide a non-aqueous battery having a good workability and a certain level of ability to swell with liquid electrolyte, as well as being capable of preventing internal shorting following detachment and movement of electrode active materials.

PATENT DOCUMENT

[Patent Document 1] JP Laid-open Patent Publication No. H5-226002
[Patent Document 2] JP Laid-open Patent Publication No. 2004-31084

DISCLOSURE OF THE INVENTION

Problems to be Solved by the Invention

However, although the gel electrolyte of Patent Document 1 can improve its liquid retaining property to some extent, such gel electrolyte can only retain a limited amount of liquid. In addition, since the coating film layer only consists of the polymer film, the film layer cannot maintain sufficient strength. Further, since the polymer used therein is a general ether-based polyurethane, its ability to swell with liquid electrolyte is not sufficient, resulting in increased internal resistance of the battery. Accordingly, Patent Document 1 fails to obtain a battery excellent in discharge rate.

Further, although the separator of Patent Document 2 has a better workability due to combination use with the base material, since the separator uses a less-swellable resin, a battery excellent in discharge rate cannot be obtained as in the case of Patent Document 1.

Moreover, neither Patent Documents 1 nor 2 is provided with a safety device that prevents, when the battery temperature rises, reaction occurring in the battery, by increasing its electric resistance.

An object of the present invention is to provide a separator for non-aqueous batteries, capable of realizing both lower electric resistance and high strength of the separator, by using a special urethane resin that is highly swellable and forms a complete film.

Another object of the present invention is to provide a separator for non-aqueous batteries, capable of realizing both lower electric resistance and short-circuit proof characteristics.

A still another object of the present invention is to provide a separator for non-aqueous batteries, capable of preventing deformation of the separator due to heat contraction by using a base material formed from a heat-resistant polymer even when the battery temperature is abnormally increased.

A still another object of the present invention is to provide a separator for non-aqueous batteries, not only being capable of promptly forming a melt-film to exhibit shutdown characteristics, but also having a resisting property to liquid electrolyte.

A still another object of the present invention is to provide a separator for non-aqueous batteries, excellent in layer integrity and easy to be handled at the step of forming a battery.

Another object of the present invention is to provide a process for producing such a separator for non-aqueous batteries in an efficient manner.

Still another object of the present invention is to provide a non-aqueous battery being capable of producing high output and achieving excellent safety.

Means for Solving the Problems

As a result of intensive studies to achieve the above objects, the inventors of the present invention have found the following. By combining a base layer with a liquid-electrolyte-swellable resin layer formed from a specific urethane resin, it is not only possible to reduce the resistance of the separator thanks to the urethane resin-derived layer's ability to swell with liquid electrolyte, but also possible to ensure the strength of the separator derived from the combination of layers to be integrated. Thus, the inventors have completed the present invention.

That is, the present invention is a separator for non-aqueous batteries, the separator comprising:

a base layer comprising a fiber aggregate, and an electrolyte-swellable resin layer formed on at least one surface of the base layer being such that the resin layer and the base layer are integrated with each other, the resin layer being capable of swelling with liquid electrolyte and comprising a urethane resin (C), the urethane resin (C) being obtained by reacting a polyol (A) with a polyisocyanate (B), the polyol (A) including a vinyl polymer (a1) having a number average molecular weight of 2000 to 7000 and a polyether polyol (a2), the vinyl polymer (a1) comprising as a main chain a vinyl polymer (a1') having two hydroxyl groups at one of the termini of the main chain, and a polyoxyethylene chain having a number average molecular weight of 200 to 800 as a side chain of the vinyl polymer (a1'), and the percentage of the polyoxyethylene chain based on the vinyl polymer (a1) being within the range of 70 mass % to 98 mass %.

For example, the vinyl polymer (a1) may be obtained by reacting a chain transfer agent (D) having two hydroxyl groups and one mercapto group, with a vinyl monomer (E) including a vinyl monomer (e) having a polyoxyethylene chain, the polyoxyethylene chain having a number average molecular weight of 200 to 800. Further, the electrolyte-swellable resin layer may be substantially non-porous. Here, being substantially non-porous means a state where the air permeability of the electrolyte-swellable resin layer is not lower than 5000 seconds/100 cc.

In a preferred embodiment, the base layer may include at least a layer of a heat-resistant polymer, and the heat-resistant polymer may be formed from a heat infusible polymer or a high melting-point polymer having a melting point exceeding 200° C. For example, the heat-resistant polymer may comprise at least one member selected from the group consisting of a fully aromatic polyamide polymer, a polyvinyl alcohol polymer, and a cellulose polymer.

Preferably, the base layer may comprise a nonwoven fabric. Such a nonwoven fabric may be one or more of nonwoven fabrics selected from the group consisting of a wet nonwoven fabric, a dry nonwoven fabric, a meltblown nonwoven fabric, a spunbond nonwoven fabric, and an electrospun nonwoven fabric, or a nonwoven fabric laminate thereof.

Further, in a preferred embodiment, the base layer may comprise a laminate of a heat-resistant polymer layer and a low melting-point polymer layer, the low melting-point polymer having a melting point of 100 to 200° C. Such a low melting-point polymer layer may be, for example, a nonwoven fabric including a nanofiber having an average fiber diameter of not greater than 1000 nm.

The low melting-point polymer constituting the low melting-point polymer layer may comprise at least one member selected from the group consisting of, for example, a polyolefin polymer, an ethylene-vinyl alcohol copolymer, and a fluoropolymer.

The present invention also includes a process for manufacturing a separator for non-aqueous batteries, which is one embodiment of the present invention. An embodiment of the manufacturing process comprises:

producing a sheet or film from a urethane resin (C) obtained by reacting a polyol (A) with a polyisocyanate (B), the polyol (A) including a vinyl polymer (a1) having a number average molecular weight of 2000 to 7000 and a polyether polyol (a2), the vinyl polymer (a1) comprising as a main chain a vinyl polymer (a1') having two hydroxyl groups at one of the termini of the main chain, and a polyoxyethylene chain having a number average molecular weight of 200 to 800 as a side chain of the vinyl polymer (a1'), and the percentage of the polyoxyethylene chain based on the vinyl polymer (a1) being within the range of 70 mass % to 98 mass %; and attaching the sheet or film to at least one surface of a base material including a fiber aggregate.

Further, another embodiment of the manufacturing process comprises:

preparing a solution or dispersion liquid of a urethane resin (C) obtained by reacting a polyol (A) with a polyisocyanate (B), the polyol (A) including a vinyl polymer (a1) having a number average molecular weight of 2000 to 7000 and a polyether polyol (a2), the vinyl polymer (a1) comprising as a main chain a vinyl polymer (a1') having two hydroxyl groups at one of the termini of the main chain, and a polyoxyethylene chain having a number average molecular weight of 200 to 800 as a side chain of the vinyl polymer (a1'), and the percentage of the polyoxyethylene chain based on the vinyl polymer (a1) being within the range of 70 mass % to 98 mass %; and applying the solution or dispersion liquid on a base material including a fiber aggregate or impregnating the base material with the solution or dispersion liquid.

Still further, the present invention also includes a non-aqueous battery equipped with the separator for non-aqueous batteries.

Any combination of at least two elements, disclosed in the appended claims and/or the specification should be construed as included within the scope of the present invention. In particular, any combination of two or more of the appended claims should be equally construed as included within the scope of the present invention.

Effect of the Invention

The separator for non-aqueous batteries of the present invention enables to obtain a separator for non-aqueous batteries, capable of both realizing lower resistance and ensuring strength which are derived from a specific urethane resin.

Further, in the case where the urethane resin forms a substantially non-porous film, such non-porous film prevents a short circuit caused by detachment of electrolytes or the like.

Further, in the case where the base layer is formed from a heat-resistant polymer, even when the battery is abnormally self-heated, deformation of the separator due to heat contraction can be prevented, and thus, improved safety of the separator for non-aqueous batteries can be achieved.

Further, by including a low melting-point polymer layer in the base layer if necessary, even when the battery are abnormally self-heated, the low melting-point polymer can promptly form a melt-film to exhibit shutdown characteristics, and thus can provide the separator with a shutdown property.

DESCRIPTION OF THE EMBODIMENTS

The separator for non-aqueous batteries of the present invention includes: a base layer comprising a fiber aggregate, and an electrolyte-swellable resin layer comprising a special urethane resin and being formed on at least one surface of the base layer being such that the resin layer and the base layer are integrated with each other.

Preferably, the electrolyte-swellable resin layer may be formed as a completely-closed film being substantially non-porous, and the base layer may be formed as a fibrous matter of a heat-resistant polymer, and further may be formed as a laminate of the fibrous matter of a heat-resistant polymer and, if needed, a fibrous matter of a low melting-point polymer.

(Electrolyte-Swellable Resin Layer)

The electrolyte-swellable resin layer capable of swelling with liquid electrolyte is formed from an electrolyte-swellable resin. The electrolyte-swellable resin used can be a urethane resin (C) obtained by reacting a polyol (A) with a polyisocyanate (B). The polyol (A) includes a vinyl polymer (a1) having a number average molecular weight of 2000 to 7000 and a polyether polyol (a2). The vinyl polymer (a1) comprises as a main chain a vinyl polymer (a1') having two hydroxyl groups at one of the termini of the main chain, and a polyoxyethylene chain having a number average molecular weight of 200 to 800 as a side chain of the vinyl polymer (a1'). The percentage of the polyoxyethylene chain based on the vinyl polymer (a1) is within the range of 70 mass % to 98 mass %.

The urethane resin (C) has a polyether unit as its main chain, and a vinyl polymer (a1) unit, or a unit derived from a vinyl polymer (a1), as a side chain. The urethane resin (C) used preferably comprises a urethane resin having a vinyl polymer (a1) unit in the percentage of 2 mass % to 50 mass % based on the total amount of the urethane resin (C).

The vinyl polymer (a1) unit constituting a side chain of the urethane resin (C) has a structure comprising a vinyl polymer (a1') as a main chain and a polyoxyethylene chain having a number average molecular weight of 200 to 800 (preferably 300 to 700) as a side chain of the vinyl polymer (a1').

In order to improve ion conductivity, the urethane resin (C) preferably has a weight average molecular weight in the range of 50000 to 150000, and more preferably, in the range of 60000 to 130000.

As the polyol (A) used in production of the urethane resin (C), as described above, it is essential to use a polyol that includes a vinyl polymer (a1) and a polyether polyol (a2), wherein the vinyl polymer (a1) has a number average molecular weight of 2000 to 7000, and comprises as a main chain a vinyl polymer (a1') having two hydroxyl groups at one of the termini of the main chain and a polyoxyethylene chain having a number average molecular weight of 200 to 800 as a side chain; and the percentage of the polyoxyethylene chain based on the vinyl polymer (a1) is within the range of 70 mass % to 98 mass %.

In production of the urethane resin (C), is used a vinyl polymer (a1) having a number average molecular weight of 2000 to 7000 and comprising as a main chain a vinyl polymer (a1') having two hydroxyl groups at one of the termini of the main chain and a polyoxyethylene chain having a number average molecular weight of 200 to 800 as a side chain of the vinyl polymer (a1'), in which the percentage of the polyoxyethylene chain based on the vinyl polymer (a1) is within the range of 70 mass % to 98 mass %. The vinyl polymer (a1) can be obtained, for example, by polymerizing a vinyl monomer (E) that includes a vinyl monomer (e) having a polyoxyethylene chain whose number average molecular weight is 200 to 800, in the presence of a chain transfer agent having two hydroxyl groups.

Specifically, examples of the vinyl polymer (a1) may include a vinyl polymer that is obtained by radical polymerization of vinyl monomers (E) in the presence of a chain transfer agent (D) having two hydroxyl groups and a mercapto group or the like, so as to allow the vinyl monomers (E) polymerized from the mercapto group.

Since the obtained vinyl polymer (a1) has two hydroxyl groups derived from the chain transfer agent (D) at one of the termini of the main chain, an urethane bond can be formed by reacting the two hydroxyl groups with isocyanate groups of a polyisocyanate (B) described below.

The obtained vinyl polymer (a1) comprises as a main chain a vinyl polymer (a1') having two hydroxyl groups at one of the termini of the main chain, and a polyoxyethylene chain having a number average molecular weight of 200 to 800 as a side chain of the vinyl polymer (an, in which the vinyl polymer (a1') is formed by polymerization of vinyl monomers (E) polymerized from the mercapto group of the chain transfer agent (D).

In order to improve ion conductivity, it is essential that the polyoxyethylene chain exists in the range of 70 mass % to 98 mass %, preferably in the range of 70 mass % to 96 mass %, relative to the total amount of the vinyl polymer (a1). The polyoxyethylene chain can be introduced into the vinyl polymer (a1) in the specific amount, by using a specific amount of a vinyl monomer (e) that has a polyoxyethylene chain having a number average molecular weight of 200 to 800, as the vinyl monomer.

As the vinyl polymer (a1), in order to improve its reactivity with the polyisocyanate (B), it is necessary to use a vinyl polymer having a number average molecular weight of 2000 to 7000, and more preferably 3000 to 6500.

As a chain transfer agent usable in production of the vinyl polymer (a1), it is preferable to use, for example, a chain transfer agent (D) having two hydroxyl groups and a mercapto group or the like.

As the chain transfer agent (D) having two hydroxyl groups and a mercapto group or the like, for example, 3-mercapto-1,2-propanediol (thioglycerin), 1-mercapto-1,1-methanediol, 1-mercapto-1,1-ethanediol, 2-mercapto-1,3-propanediol, and the like can be used. In particular, 3-mercapto-1,2-propanediol is preferably used because of its reduced smell, excellence in workability and safety, and its general usage.

Further, examples of the vinyl monomer (E) used in production of the vinyl polymer (a1) may include a vinyl monomer (e) comprising a polyoxyethylene chain that has a number average molecular weight of 200 to 800 among polyoxyethylene monomethyl ether (meth)acrylate and the like. In particular, a polyoxyethylene monomethyl ether (meth)acrylate is preferably used in order to improve reactivity and ion conductivity.

Further, as the vinyl monomer (E) used in production of the vinyl polymer (a1), other vinyl monomers may be used in combination with the vinyl monomer (e) to an extent that they do not impair the effect of the present invention.

Such other vinyl monomers, for example, may include a vinyl monomer comprising a polyoxyethylene chain having a number average molecular weight outside the range of 200 to 800, and also, methyl(meth)acrylate, ethyl(meth)acrylate, n-butyl(meth)acrylate, i-butyl(meth)acrylate, t-butyl(meth)acrylate, 2-ethylhexyl(meth)acrylate, hexyl(meth)acrylate, cyclohexyl(meth)acrylate, and the like.

Polymerization reaction between the chain transfer agent (D) and the vinyl monomer (E) can be conducted, for example, by supplying the chain transfer agent (D) and the vinyl monomer (E) at the same time or sequentially into a solvent such as methyl ethyl ketone at a temperature about 50° C. to 100° C., to allow them to undergo radical polymerization. According to this procedure, radical polymerization of the vinyl monomer (E) starts from the mercapto group or the like of the chain transfer agent (D) to yield a desired vinyl polymer (a1). When producing the vinyl polymer (a1) through the above process, a conventionally known polymerization initiator may be used if necessary.

The vinyl polymer (a1) obtained through the above process is preferably used in the range of 20 mass % to 90 mass % based on the total amount of the polyol (A) used in production of the urethane resin (C), and more preferably, in the range of 20 mass % to 60 mass %, in order to improve ion conductivity.

Further, as the polyol (A) used in production of the urethane resin (C), the polyether polyol (a2) is used along with the vinyl polymer (a1). The polyether polyol (a2) is used in order to introduce a polyether structure into the urethane resin (C), and is important for improving mechanical strength and ion conductivity.

As the polyether polyol (a2), for example, it is possible to use a polyether polyol obtained through addition polymerization of an alkylene oxide, using, as an initiator, one or more compounds that have two or more active hydrogen atoms.

Examples of the initiator may include ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, and others.

Further, examples of the alkylene oxide may include ethylene oxide, propylene oxide, butylene oxide, styrene oxide, epichlorohydrin, tetrahydrofuran, and the like.

As the polyether polyol (a2), specifically, it is preferable to use one or more members selected from the group consisting of a polyoxyethylene glycol, a polyoxypropylene glycol, and a copolymer of ethylene oxide and tetrahydrofuran, in order to provide mechanical strength and ion conductivity. Further, as the polyether polyol (a2), it is preferable to use a polyether polyol having a number average molecular weight of 800 to 5000.

Further, as the polyol (A), it is preferable to use a polyol that includes the vinyl polymer (a1) and the polyether polyol (a2) in the range of mass ratio [(a1)/(a2)] of 1/9 to 4/6, in order to achieve both high ion conductivity and improved durability.

As the polyol (A) used in production of the urethane resin (C), in addition to the above described polyol, other polyols can be used, if necessary. As other polyols, for example, a polyester polyol, a polycarbonate polyol, and the like, can be used to an extent that they do not impair the effect of the present invention.

Further, as the polyisocyanate (B) used in production of the urethane resin (C), for example, it is possible to use an aromatic polyisocyanate such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; an aliphatic polyisocyanate such as hexamethylene diisocyanate, lysine diisocyanate, cyclohexane diisocyanate, isophorone diisocyanate, dicyclohexylmethane diisocyanate, xylylene diisocyanate, and tetramethyl xylylene diisocyanate; or a polyisocyanate having an alicyclic structure. In particular, 4,4'-diphenylmethane diisocyanate is preferably used.

The urethane resin (C) can be produced, for example, by reacting a polyisocyanate (B) with a polyol (A) including a vinyl polymer (a1), a polyether polyol (a2), and other polyols if necessary, without using a solvent or in the presence of an organic solvent. Specifically, the reaction is performed preferably in the range of 20° C. to 120° C., for about 30 minutes to 24 hours.

The reaction between the polyol (A) and the polyisocyanate (B) is preferably performed, for example, with an equivalent ratio of the isocyanate groups of the polyisocyanate (B) to the hydroxyl groups of the polyol (A) being in the range of 0.8 to 2.5, and more preferably, in the range of 0.9 to 1.5.

As an organic solvent that can be used in production of the urethane resin (C), for example, ketones such as acetone and methyl ethyl ketone: ethers such as tetrahydrofuran and dioxane, acetic acid esters such as ethyl acetate and butyl acetate; nitryls such as acetonitrile: amides such as dimethylformamide and N-methylpyrrolidone, may be used singly or in combination of two or more. The organic solvent may be used as a solvent for the urethane resin composition of the present invention.

When producing the urethane resin (C) used in the present invention, a chain extending agent can be used if necessary, for the purpose of allowing the urethane resin (C) to have a relatively large molecular weight, and further improving abrasion resistance, and the like. As the chain extending agent, a polyamine, a compound containing active hydrogen atoms, and the like can be used.

Examples of the polyamine may include ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, or the like, and ethylenediamine is preferably used.

As the compound containing active hydrogen atoms, for example, ethylene glycol, diethylene glycol, triethylene glycol, propylene glycol, 1,3-propanediol, 1,3-butanediol, 1,4-butanediol, and the like can be used singly or in combination of two or more, to an extent that they do not reduce the preservation stability of the urethane resin of the present invention.

The chain extending agent is preferably used, for example, at an equivalent ratio of the amino groups of the polyamine to surplus isocyanate groups of not greater than 1.9 (equivalent ratio), and more preferably in the range of 0.3 to 1.0 (equivalent ratio).

(Base Layer)

The base layer including a fiber aggregate is not particularly limited to a specific one as long as it has electrolyte resistance and can be integrated with a resin layer capable of swelling with liquid electrolyte. The base layer may be any of woven or knitted fabric, nonwoven fabric, and the like formed using various types of fiber materials, but a nonwoven fabric is preferable.

For example, the nonwoven fabric preferably is a nonwoven fabric formed by wet sheet-forming method, dry sheet-forming method (such as thermal bonding and chemical bonding), spun lace method, air-laid method, needle-punch method, and the like. A wet nonwoven fabric formed through wet sheet-forming is most preferable because a thin and uniform sheet can be obtained.

Examples of the fiber material may include a heat-resistant polymer fiber formed from a heat-resistant polymer described later, a polyolefin fiber (e.g., polypropylene fiber), and a polyester fiber (e.g., polyethylene terephthalate, polyethylene naphthalate, and polybutylene terephthalate fibers). These fiber materials may be used singly or in combination of two or more. Further, the nonwoven fabric layer may include various types of known additives (e.g., antioxidant) if necessary.

Of these, from the viewpoint of improving the heat-resisting property of the separator, the base layer preferably includes at least a heat-resistant polymer layer.

(Heat-Resistant Polymer Layer)

The heat-resistant polymer layer functions as a support for a resin layer capable of swelling with liquid electrolyte, and if necessary also as a support when a low melting-point polymer layer is provided to form a coating film. From the viewpoint of retaining the overall shape of the separator even when the separator is exposed to a high temperature, the heat-resistant polymer layer preferably includes at least one type of heat-resistant polymer selected from the group consisting of a heat infusible polymer and a high melting-point polymer having a melting point exceeding 200° C.

The heat-resistant polymer is not particularly limited to a specific one as long as it has a predetermined heat-resisting property and can be formed into a fiber. Examples of such polymers having a melting point exceeding 200° C. (or high melting-point polymers) include a fully aromatic polyamide polymer (e.g., a para-aramid obtained through condensation copolymerization of p-phenylenediamine and terephthaloyl chloride, a meta-aramid obtained through condensation copolymerization of m-phenylenediamine and isophthaloyl chloride, and an aromatic polyether amide), a polyimide polymer (e.g., a thermoplastic polyimide and a polyether imide), a polycarbonate polymer (e.g., a bisphenol-A type polycarbonate), a polyphenylene sulfide polymer (e.g., a polyphenylene sulfide), a polyphenylene ether polymer (e.g., a polyphenylene ether), a polyether ketone polymer (e.g., a polyether ketone and a polyether ether ketone), and a polysulfone polymer (e.g., a polysulfone and a polyether sulfone). These high melting-point polymers can be used singly or in combination of two or more.

From the viewpoint of retaining the configuration of the separator at the time of abnormal heat generation in the battery, the melting point of such high melting-point polymers needs to be higher than 200° C. (e.g., about 205 to 400° C.), and preferably, may be about 220 to 350° C. It should be noted that the method for measuring the melting point is described in detail in Examples below.

Further, the difference in the melting points between the high melting-point polymer and the low melting-point polymer which may be laminated if necessary may be, for example, about 50 to 200° C., and preferably about 60 to 180° C.

Examples of the heat infusible polymer may include a polyvinyl alcohol polymer (e.g., a high-tenacity polyvinyl alcohol), and a cellulose polymer [for example, a purified cellulose (e.g., TENCEL (registered trademark)), a regenerated cellulose (e.g., a viscose rayon, a polynosic rayon, and a cuprammonium rayon), a natural cellulose (e.g., a wood pulp, a hemp pulp, and a cotton linter), and a semisynthetic cellulose (e.g., a cellulose ester such as a cellulose acetate, a cellulose acetate butyrate, and a cellulose acetate propionate)]. These heat infusible polymers may be used singly or in combination of two or more. It should be noted that high-tenacity polyvinyl alcohol fibers can be produced by extruding a spinning liquid through a nozzle into a solvent, to be immediately cooled to form a gel (solidification into a gelatinous form), and then removing the solvent therefrom. Such a high-tenacity polyvinyl alcohol fiber is commercially available as "Kuralon (registered trademark)" from Kuraray Co., Ltd.

It is sufficient if the heat infusible polymer exhibits infusibility against a temperature exceeding, for example, 200° C. (e.g., about 205 to 400° C.), and preferably about 220 to 350° C.

Of these heat-resistant polymers, from the viewpoint of providing both heat-resisting property and electrolytic-solution-resisting property, fully aromatic polyamide polymers, polyvinyl alcohol polymers, cellulose polymers, and the like are preferable.

The heat-resistant polymer layer preferably includes a mixture of a nanofiber having a fiber diameter of not greater than 1000 nm and a non-nanofiber having a fiber diameter greater than 1000 nm, both of which are formed from the heat-resistant polymer. Here, the heat-resistant polymer layer may be produced by once separately preparing a nanofiber and a non-nanofiber layer from a heat-resistant polymer, and then mixing these fibers to form a layer. Alternatively, the heat-resistant polymer layer may be produced by, for example, beating a non-nanofiber of a heat-resistant polymer fiber to form a fibril, and then mixing the resultant nanofiber fibril and the non-nanofiber to form a layer.

For example, the ratio of the nanofiber and the non-nanofiber in the mixture (nanofiber/non-nanofiber: mass ratio) can be selected from a wide range of 10/90 to 90/10, and may be preferably about 20/80 to 80/20, and more preferably about 30/70 to 70/30.

When beating a fiber, the beating degree is preferably about 0 to 300 ml in terms of CSF, more preferably 0 to 200 ml, and still more preferably 0 to 150 ml. It should be noted that the method for measuring the beating degree is described in detail in Examples below.

Further, the heat-resistant polymer may be formed from a mixture of a nanofiber and a non-nanofiber of different heat-resistant polymers as long as the mixture can form a heat-resistant polymer layer. However, it is preferable that they are formed from the same type of heat-resistant polymer.

In the case where the heat-resistant polymer layer is a nonwoven fabric, the nonwoven fabric may include the heat-resistant polymer as its matrix fiber, and may further include a binder fiber. In this case, from the viewpoint of improving the sheet strength and the binder fiber's adhesiveness to the nanofiber layer and improving liquid retaining property of the separator, the blending ratio (parts by mass) of the matrix fiber and the binder fiber may be about 90/10 to 50/50, and preferably about 85/15 to 55/45.

(Low Melting-Point Polymer Layer)

The base layer may be a nonwoven fabric formed from the heat-resistant polymer layer described above and a low melting-point polymer layer of a low melting-point polymer having a melting point of 100 to 200° C. In this case, it is important that the low melting-point polymer layer to laminated if necessary includes a low melting-point polymer having a melting point of 100 to 200° C. By allowing the low melting-point polymer layer to include a polymer having a melting point of 100 to 200° C., even when the battery temperature has risen due to an abnormal current or an internal short circuit caused by lithium dendrites, the melted low melting-point polymer layer can form a coating film so as to increase the resistance of the separator to have shutdown characteristics.

The low melting-point polymer layer may be formed, in the base layer, on the side of or the opposite side to the resin layer capable of swelling with liquid electrolyte, as long as the low melting-point polymer layer can achieve the shutdown characteristics.

Examples of the low melting-point polymer forming the low melting-point polymer layer may include a polyolefin polymer (e.g., a polyethylene, a polypropylene, a polybutene, and an ethylene-propylene copolymer); an ethylene-vinyl alcohol copolymer; a fluoropolymer (e.g., a polyvinylidene difluoride, a copolymer of vinylidene fluoride and hexafluoropropylene, and a copolymer of ethylene and vinylidene fluoride); a vinyl polymer (e.g., a polystyrene, an ABS, an AS, a polyvinyl chloride, and a polyvinylidene chloride), and an acrylic polymer (e.g., a polyacrylonitrile, a poly(meth)acrylic acid, and a poly(meth)acrylic ester). These polymers may be used singly or in combination of two or more.

Of these polymers, from the viewpoint of the ability of the polymer to form a coating film when it is melted, its chemical stability in the battery, and the like; polyolefin polymers (e.g., polyethylene and polypropylene), ethylene-vinyl alcohol copolymers, and fluoropolymers (e.g., polyvinylidene difluoride, and a copolymer of vinylidene fluoride and hexafluoropropylene) are preferable.

In more detail, such an ethylene-vinyl alcohol copolymer (EVOH) may be preferably a copolymer comprising 25 mol % to 70 mol % of ethylene unit and vinyl alcohol unit as a repeat unit, or a copolymer comprising 25 mol % to 70 mol % of ethylene unit, vinyl alcohol unit and other vinyl monomer unit as a repeat unit.

The ethylene-vinyl alcohol copolymer can be obtained by saponifying vinyl acetate units of the ethylene-vinyl acetate copolymer, and may have a saponification degree of, for example, not lower than about 95 mol %, preferably not lower than 98 mol %, more preferably not lower than 99 mol % but not higher than 100 mol %.

Further, the number average molecular weight of the ethylene-vinyl alcohol copolymer may be about 5000 to 40000, and preferably about 8000 to 30000. It should be noted that the number average molecular weight of EVOH here is a value measured by the GPC method. Such an ethylene-vinyl alcohol copolymer is commercially available, for example, under the trade name of EVAL from Kuraray Co., Ltd., and under the trade name of Soarnol from The Nippon Synthetic Chemical Industry Co., Ltd. Moreover, an ethylene-vinyl alcohol copolymer may be produced by radical polymerization of commercially available ethylene and vinyl acetate to obtain an ethylene-vinyl acetate copolymer, followed by saponification of the ethylene-vinyl acetate copolymer.

From the viewpoint of exhibiting shutdown characteristics, the melting point of such a low melting-point polymer need to be 100 to 200° C., and may preferably be about 120 to 180° C., and more preferably about 130 to 170° C. The method for measuring the melting point is described in detail in Examples below.

The low melting-point polymer layer preferably includes a nanofiber formed from the low melting-point polymer and having a fiber diameter of not greater than 1000 nm. The low melting-point polymer layer may include a non-nanofiber to an extent that it does not hinder the shutdown effect, but the fibers in the low melting-point polymer layer preferably is composed of only nanofibers.

Although the nanofiber may be produced from the low melting-point polymer, using a known or commonly used method such as a meltblown method, it is preferable to form a fiber aggregate of the nanofiber (that is, low melting-point polymer layer), using an electrospinning method.

For example, the average fiber diameter of the fiber forming the low melting-point polymer layer may typically be about 10 to 1000 nm, preferably about 10 to 800 nm, and more preferably about 30 to 600 nm. It should be noted that the method for measuring the average fiber diameter is described in detail in Examples below.

(Process for Manufacturing Separator)

The process for manufacturing the separator of the present invention is not particularly limited to a specific one as long as the base layer including a fiber aggregate and the resin layer capable of swelling with liquid electrolyte are combined to be integrated with each other, and various processes are conceivable. For example, an embodiment of the manufacturing process may include at least attaching a sheet or film formed from a urethane resin (C) to at least one surface of a base material including a fiber aggregate, to make a laminate. In this case, the sheet or film is formed from the urethane resin (C) typically through a process described later. Further, another embodiment of the manufacturing process may include impregnating a base material including a fiber aggregate with a solution or dispersion liquid including a urethane resin (C) or applying (coating) the solution or dispersion liquid including the urethane resin (C) on the support base material.

In the separator of the present invention, the base layer including the fiber aggregate and the resin layer capable of swelling with liquid electrolyte are integrated with each other. However, since the base layer is a fiber aggregate, various configurations are conceivable as the integration form. For example, the electrolyte-swellable resin layer soaked with liquid electrolyte may be provided inside the fiber aggregate of the base layer, or may be provided on a surface of the fiber aggregate, or still further, may be provided both inside and on a surface of the aggregate.

In the case where the electrolyte-swellable resin is provided on a surface of the base layer, the electrolyte-swellable resin may be a sheet-like matter or a film-like matter formed on at least one surface of the base layer. Although the electrolyte-swellable resin to be formed is sufficient to cover at least a part of the surface of the base layer, it is more preferable that the resin covers the entire surface.

The electrolyte-swellable resin is applicable to the base layer through impregnation, application, or lamination, using a known or commonly used method. For example, by preparing a resin solution by diluting the electrolyte-swellable resin in a solvent capable of dissolving the resin, then by impregnating the base layer with the resin solution or applying the resin solution on the base layer, a sheet-like matter or film-like matter of the electrolyte-swellable resin may be formed on at least a surface of the base layer.

Alternatively, by cast-molding the electrolyte-swellable resin on the base layer as a support, a sheet-like matter or film-like matter of the electrolyte-swellable resin may be formed on one or both of the surfaces of the base layer. Still alternatively, after a sheet or film of the electrolyte-swellable resin has been formed once, the obtained sheet or film may be attached to the base layer. From the viewpoint of the quality stability of a resultant separator for batteries, a method is preferable in which a sheet or film of the electrolyte-swellable resin is formed first, and then, the obtained sheet or film is attached to the base layer.

It should be noted that the sheet or film of the electrolyte-swellable resin may be formed in a plurality of layers. Thus, the same type or different types of sheets or films of the electrolyte-swellable resin formed in a plurality of layers may be prepared in advance and then attached to the base material. Alternatively, a sheet or film of the electrolyte-swellable resin formed in one layer is attached to the base layer to make a laminate, and then, the same type or different types of sheets or films of the electrolyte-swellable resin may be further attached to the sheet or film of the electrolyte-swellable resin of that laminate.

It should be noted that, depending on the work procedure, the electrolyte-swellable resin may be applied to the heat-resistant polymer layer on which a low melting-point polymer layer has been laminated in advance, through coating, impregnation, or attachment.

In the heat-resistant polymer layer, the ratio of the heat-resistant polymer fiber aggregate to the electrolyte-swellable resin may be, for example, in terms of mass ratio, (former)/ (latter) of about 30/70 to 90/10, preferably about 40/60 to 80/20, and more preferably about 50/50 to 75/25.

In the present invention, the low melting-point polymer layer, which may be laminated if necessary, may be any of woven or knitted fabric or nonwoven fabric using a low melting-point polymer, but preferably is a nonwoven fabric, and more preferably a nonwoven fabric formed from a nanofiber.

For example, in the case where the low melting-point polymer layer is a nonwoven fabric formed from a nanofiber, the forming process can be adjusted as appropriate. The process at least includes: forming a low melting-point polymer layer by preparing a nanofiber having a fiber diameter not greater than 1000 nm from a low melting-point polymer having a melting point of 100 to 200° C.; and laminating the low melting-point polymer layer and a composite of a heat-resistant polymer layer and a specific urethane resin.

Further, from the viewpoint of being able to form a uniform and dense nanofiber layer, it is preferable to form the nanofiber layer by an electrospinning method. In such a case, the process for manufacturing the separator may at least include: preparing a spinning liquid from a melted low melting-point polymer; and electrospinning the spinning liquid to form a nanofiber aggregate to be laminated on the heat-resistant polymer layer so as to form a composite.

In the electrospinning step, first, a spinning liquid for making the nanofiber is prepared. This spinning liquid may be a solution obtained by dissolving a polymer in a solvent capable of dissolving the polymer, or a melting the polymer to obtain a melted polymer. Either of them can be used as the spinning liquid in the electrospinning method.

In the case of dissolving the polymer in a solvent, a solution of the polymer uniformly dissolved so as not to include granular gels can be used as the spinning liquid. Depending on the type of the polymer as a solute, various types of solvents can be used. Examples of the solvent include water and organic solvents (alcohols such as methanol, ethanol, propanol, isopropanol, hexafluoroisopropanol, benzyl alcohol, phenol, and toluene; ketones such as acetone, 1,4-butyrolactone, cyclohexanone, and 3-methyloxazolidine-2-on; ethers such as 1,4-dioxane, 1,2-dimethoxyethane, tetrahydrofuran, 2-methyltetrahydrofuran, diethyl ether, and 1,3-dioxolane; aromatic hydrocarbons such as benzene; halogenated hydrocarbons such as chloroform, carbon tetrachloride, trichloroethane, and methylene chloride; alicyclic hydrocarbons such as cyclohexane; organic acids such as acetic acid and formic acid; amides such as N,N-dimethylformamide (DMF), N,N-dimethylacetamide, 1-methyl-2-pyrolidone (NMP), and 1,3-dimethyl-2-imidazolidinone; sulfoxides such as dimethyl sulfoxide (DMSO); carbonates such as ethylene carbonate, propylene carbonate, dimethyl carbonate, diethyl carbonate, ethyl methyl carbonate, and butylene carbonate; nitriles such as acetonitrile; amines such as pyridine; N-alkylmorpholine oxides such as N-methylmorpholine oxide, N-ethylmorpholine oxide, N-propylmorpholine oxide, N-isopropylmorpholine oxide, N-butylmorpholine oxide, N-isobutylmorpholine oxide, and N-tert-butylmorpholine oxide; esters such as methyl formate and methyl propionate; sulfones such as sulfolane, and the like). These solvents may be used singly or in combination of two or more.

On the other hand, when the polymer is to be melted, the spinning liquid is not limited to a specific one as long as electrospinning can be performed using the melted polymer. For example, after heating and melting the polymer using an extruder or another heating medium, the melted polymer may be used as the spinning liquid. Alternatively, a rod-like polymer may be irradiated with a laser beam to be heated and melted before the electrospinning, and the melted polymer may be used as the spinning liquid.

Next, using the spinning liquid, the polymer is spun by the electrospinning method to form an aggregate of an ultrafine fiber having a nano-meter scale diameter, that is, a nanofiber layer.

The electrospinning method is not limited to a specific one, and the electrospinning method includes applying a high voltage to a conductive member that can supply the spinning liquid, and depositing a nanofiber on the side of the counter electrode which is grounded. Accordingly, the spinning liquid emitted from a spinning liquid supply unit is charged and split into droplets. Then, by the action of the electric field, fibers are continuously drawn from one point of the liquid droplets, and thus, a number of fibers are spread. Even when the concentration of the polymer is not higher than 10%, the solvent readily dries during fiber formation and thinning, and thus, the spun fibers deposit on a collecting belt or sheet set at a distance of several centimeters to several tens of centimeters from the spinning liquid supply unit. During the deposition, slight bonding of the semi-dried fibers occurs, which prevents movement of the fibers. Accordingly, new fine fibers are sequentially deposit thereon, whereby a dense sheet-shaped nanofiber layer can be obtained.

The composite of the resin layer capable of swelling with liquid electrolyte and the base layer may be subjected to heat pressing treatment such as embossing or calendaring if necessary, to improve adhesiveness (or integration) in the composite. Further, the composite may be subjected to cold pressing if necessary, to have a desired thickness.

(Separator for Batteries)

A separator for batteries obtained in this manner may have a total basis weight of, for example, in a range of about 5 to 45 $g/m^2$, preferably about 6 to 25 $g/m^2$, and more preferably about 7 to 20 $g/m^2$.

Since the base layer serves as a support and thus needs to have physical properties strong enough to withstand an actual production step of batteries, the base layer preferably has a basis weight of about 6 to 20 $g/m^2$, and more preferably, may have a basis weight of about 8 to 15 $g/m^2$. Too small a basis weight may not result in obtaining a strength that allows the base layer to withstand the production step. On the other hand, too great a basis weight results in too great a thickness of the base material, creating a long distance between electrodes, which may result in an increased battery resistance. It should be noted that the method for measuring the basis weight is described in detail in Examples below.

Further, the thickness of the separator for batteries may be, for example, about 8 to 50 μm, and preferably about 10 to 30 μm. It should be noted that the method for measuring the thickness is described in detail in Examples below.

Further, the density of the separator for batteries may be, for example, about 0.3 to 1.0 $g/cm^3$, and preferably about 0.4 to 0.9 $g/cm^3$.

Further, from the viewpoint of ease of handling, the separator for batteries of the present invention may have a strength of, for example, about not less than 0.7 kg/15 mm (e.g., 0.7 to 3 kg/15 mm), and preferably about 1.2 to 2 kg/15 mm. It should be noted that the method for measuring the strength is described in detail in Examples below.

Further, the liquid absorption capacity of the separator may be, for example, not less than 1.5 g/g (e.g., about 1.5 to 8 g/g), preferably about 3 to 8 g/g, and more preferably 5.5 to 7.5 g/g. It should be noted that the method for measuring the liquid absorption capacity is described in detail in Examples below.

Further, since the resin layer capable of swelling with liquid electrolyte and the base layer are integrated with each other, the air permeability of the separator of the present invention may be, for example, not lower than 5000 seconds/100 cc. It should be noted that the method for measuring the air permeability is described in detail in Examples below.

Still further, preferably, the separator for batteries of the present invention has excellent resisting properties against, in particular, hydrogen fluoride generated through pyrolysis of the liquid electrolyte. For example, the separator for batteries preferably has a weight loss percentage of not higher than 2% after the separator being left in a 1 mol % lithium hexafluorophosphate liquid at 100° C. for 30 minutes, more preferably not higher than 1%, and more preferably 0% in particular. It should be noted that the method for measuring the weight loss percentage is described in detail in Examples below.

The separator for batteries of the present invention can adapt to high output batteries, and may have an initial resistance of, for example, about 0.5 to 10Ω, and preferably about 1 to 8Ω. Further, the presence of the low melting-point polymer layer, which may be laminated if necessary, allows excellent shutdown characteristics. Thus, the resistance of the separator after having been heated at a temperature of [(the melting point of the low melting-point polymer forming the low melting-point polymer layer)+10]° C. for 30 minutes may be twice or more (e.g., about 2 to 300 times) of the initial resistance measured before the heating, preferably about 3 to 200 times, and more preferably about 10 to 150 times. It should be noted that the methods for measuring the initial resistance and the resistance after heating are described in detail in Examples below.

(Non-Aqueous Battery)

The present invention also includes non-aqueous batteries equipped with the separator. A non-aqueous battery basically includes a positive electrode, a negative electrode, a non-aqueous liquid electrolyte, and a separator, and may additionally include other members if necessary that are typically used in the technical field of the non-aqueous liquid electrolyte battery. The shape of the non-aqueous battery of the present invention is not limited to a specific one. The non-aqueous battery of the present invention can be used as batteries having various shapes, such as those of a coin type, a button type, a paper type, a cylinder type, a square type, and the like.

The positive-electrode active material for the non-aqueous battery of the present invention is partly different in a primary battery and a secondary battery. Preferable examples of the positive-electrode active material for the non-aqueous liquid electrolyte primary battery include graphite fluoride [$(CF)_n$], $MnO_2$, $V_2O_5$, $SOCl_2$, $SO_2$, $FeS_2$, $CuO$, $CuS$, and the like. These positive-electrode active materials may be used singly or in combination of two more. Of these, graphite fluoride and $MnO_2$ are preferable because they can achieve high energy density and are excellent in safety.

Further, examples of the positive-electrode active materials for a non-aqueous liquid electrolyte secondary battery include metal oxides such as $V_2O_5$ and $Nb_2O_5$, lithium-containing composite oxides such as $Li_{(1-m)}NiO_2$, $Li_{(1-m)}MnO_2$, $Li_{(1-m)}Mn_2O_4$, $Li_{(1-m)}CoO_2$, and $Li_{(1-m)}FeO_2$ (0≤m≤1.0), and conductive polymers such as polyaniline-based lithium fiber metal compound, e.g., $LiFePO_4$. These positive-electrode active materials may be used singly or in combination of two or more. Of these, $Li_{(1-m)}CoO_2$, $Li_{(1-m)}NiO_2$, and $Li_{(1-m)}MnO_2$ having a layer structure or a spinel structure are preferable, and in particular, $LiCoO_2$, $LiNiO_2$, and $LiMn_2O_4$ are preferable, since they can achieve high energy density and are excellent in safety.

The negative electrode active material for the non-aqueous battery of the present invention is partly different in a primary battery and a secondary battery. Examples of the negative electrode active material for the non-aqueous liquid electrolyte primary battery include lithium metal and lithium alloys such as Mg—Li alloys and Al—Li alloys. These negative electrode active materials may be used singly or in combination of two or more.

On the other hand, examples of the negative electrode active material for the non-aqueous liquid electrolyte secondary battery include lithium metal, carbon materials such as graphite or amorphous carbon, and the like. In particular, carbon materials are preferably used. Since a carbon material has a relatively large specific surface area and is quick in adsorption and release of lithium, good discharge and charge characteristics in a large current as well as higher output and regeneration densities can be achieved. In particular, taking into consideration the balance of the output and regeneration densities, it is preferable to use a carbon material having a relatively large voltage change at the time of discharge and charge.

Further, by using such a carbon material as a negative electrode active material, higher discharge and charge efficiencies and good cycle characteristics can be obtained. In the case where a carbon material is used as a negative electrode active material, it is preferable to obtain, if necessary, a negative electrode composite material by mixing a conductive material and a binder with the negative electrode active material, and then to apply this negative electrode composite material on a collector, to be used.

EXAMPLES

Hereinafter, the present invention will be demonstrated by way of some examples that are presented only for the sake of illustration, which are not to be construed as limiting the scope of the present invention. It should be noted that the physical properties were evaluated in the following manners in Examples below. It should be noted that part(s) and percentage(s) in Examples relate to mass unless otherwise mentioned.

[Average Fiber Diameter (nm)]

In a base layer 100 fibers were chosen at random from nonwoven fabric constituent fibers of the base layer in a microscopic photograph of an enlarged cross-section taken at a magnifying power of 5000, to measure their fiber diameters. Then, the average value of the measured fiber diameters was used as the average fiber diameter.

[Polymer Melting Point (° C.)]

A sample (50 mg) was measured using a differential scanning calorimeter (product of Seiko Instruments Inc.: DSC6200) to determine an endothermic-peak value. The obtained endothermic-peak value was used as the melting point.

[Basis Weight (g/m$^2$)]

The basis weight was determined in accordance with "Paper and board—Determination of grammage" of Japanese Industrial Standards (JIS) P 8124.

[Thickness (μm)]

The thickness was determined in accordance with "Paper and board—Determination of thickness and density" of JIS P 8118.

[Strength (kg/15 mm)]

The strength was determined in accordance with "Paper and board—Determination of tensile properties" of JIS P 8113.

[Liquid (Electrolyte) Absorption Capacity(g/g)]

A sample of 50 mm×50 mm was immersed in a 1 mol % lithium tetrafluoroboric acid liquid (Kishida Chemical Co., Ltd., 1 mol/L LiBF$_4$/EC:EMC (3:7) v/v %) (23° C.) at a bath ratio of 1/100 for 30 minutes, and then, the immersed sample was left to be drained for 30 seconds. Thereafter the weight of the sample was measured. The liquid absorption capacity was calculated by dividing the weight of the liquid held in the sample by the weight of the sample before being immersed.

[Air Permeability (Seconds/100 Cc)]

The air permeability was measured using a Gurley densometer in accordance with JIS P 8117.

[Electrolyte Proof Property (%)]

A sample of 5 cm×5 cm was weighed in advance, and then immersed in a 1 mol % lithium hexafluorophosphate liquid (Kishida Chemical Co., Ltd., 1 mol/L LiPF$_6$/EC:EMC (3:7) v/v %) to be left at 100° C. for 30 minutes. Then, the sample was taken out, washed with water, and then dried. The weight of the dried sample was measured, and then, a weight loss percentage (%) of the sample was determined based on the weights before and after the immersion of the sample in the lithium hexafluorophosphate liquid.

[Initial Resistance (Ω)]

A sample was immersed in a 1 mol % lithium tetrafluoroboric acid liquid (Kishida Chemical Co., Ltd., 1 mol/L LiBF$_4$/EC:EMC (3:7) v/v %) at 20° C. for 30 minutes. Then, using the sample holding a sufficient amount of the liquid (having left to be drained for 30 seconds), the initial resistance was measured in measurement atmosphere (20° C.×65% RH), using an impedance measuring device (product of KOKUYO ELECTRIC CO., LTD.: KC-547 LCR METER).

When the resistance was not greater than 5Ω, the sample was determined as good, because the low resistance allows production of a high output non-aqueous battery. On the other hand, when the resistance was greater than 5Ω, the sample was determined as "poor" because the high resistance leads to an inferior non-aqueous battery.

[Resistance after Heating (Ω)]

A liquid electrolyte of 1 mol % lithium hexafluorophosphate liquid (product of Kishida Chemical Co., Ltd., 1 mol/L LiPF$_6$/EC:EMC (3:7) v/v %) and a sample were put in a stainless steel airtight vessel, to be heated in an oil bath at a temperature of [(the melting point of the low melting-point polymer forming the low melting-point polymer layer+10)]° C. for 30 minutes. Using the heated sample holding a sufficient amount of the liquid (having left to be drained for 30 seconds), the resistance after the heating was measured in measurement atmosphere (20° C.×65% RH), using an impedance measuring device (product of KOKUYO ELECTRIC CO., LTD.: KC-547 LCR METER).

When the resistance was increased twice or more of the resistance before the heating, the sample was determined as "good" because the effect of shutdown characteristics was exhibited. When the resistance was lower than twice the resistance before the heating, the sample was determined as "poor".

Example 1

(1) Preparation of Urethane Resin Composition

Into a four-necked flask equipped with a thermometer, an agitator, a reflux condenser tube, and a nitrogen inlet tube, was put 500 parts by mass of methyl ethyl ketone. Then, into this reaction vessel, 485 parts by mass of polyoxyethylene monomethyl ether methacrylate (number average molecular weight of polyoxyethylene chain: 500) and 15 parts by mass of 3-mercapto-1,2-propanediol were supplied to react. After the reaction, a vinyl polymer (a1-1) having a number average molecular weight of 6000 and having two hydroxyl groups at one of the termini of the main chain, in which the ratio of its polyoxyethylene chains based on the total amount of the vinyl polymer was 95 mass %, was obtained.

Then, 50 parts by mass of the vinyl polymer (a1-1), 150 parts by mass of polyoxyethylene glycol (number average molecular weight: 1500), 15 parts by mass of 1,4-butanediol, and 100 parts by mass of 4,4'-diphenylmethane diisocyanate were reacted for 4 hours in the presence of 300 parts by mass of methyl ethyl ketone as an organic solvent. Then, 200 parts by mass of methyl ethyl ketone as a dilution solvent was added thereto, and the reaction was allowed to continue.

When the weight average molecular weight of the reactant reached the range of 80000 to 120000, 3 parts by mass of methanol was added thereto to terminate the reaction. By further adding thereto 175 parts by mass of methyl ethyl ketone as a dilution solvent, a urethane resin composition (X-1) having a nonvolatile content of 30 mass % containing a urethane resin, was obtained.

(2) Production of Nonwoven Fabric Layer
(Heat-Resistant Polymer Layer)

A solvent-spun cellulose fiber (product of Courtaulds: TENCEL, 1.7 dtex, 3 mm long) was beaten using a pulper and a fiberizer to be a fibrillated matter having a CSF value of 100 ml. A slurry was prepared using this fiber as a matrix fiber and a polyvinyl alcohol fiber (product of Kuraray Co., Ltd.: "VPB105-2") as a binder fiber, at a weight ratio of matrix fiber:binder fiber of 80:20.

This slurry was run through a cylinder paper machine to make a paper, and the resultant paper was dried with a dryer at a temperature of 130° C., to produce a heat-resistant polymer layer having a basis weight of 10.9 g/m$^2$ and a thickness of 15 μm.

(3) Using the Nonwoven Fabric and the Urethane Resin Composition (X-1) Produced as Above, a Separator for Batteries was Manufactured Through the Following Process A resin solution 1 was prepared in the following formulation, then applied on an entire surface of release paper using a knife coater, and then dried at 100° C., to form an electrolyte-swellable resin film 1 having a thickness of 14

Resin Solution 1

| | |
|---|---|
| Urethane resin composition (X-1) | 100 parts by mass |
| Dimethylformamide | 15 parts by mass |
| Methyl ethyl ketone | 15 parts by mass |

Next, a resin solution 2 was prepared, then applied, using a knife coater, on an entire surface of the electrolyte-swellable resin film 1 formed on the release paper, and then dried at 100° C., to form an electrolyte-swellable resin film 2 having a thickness of 14 μm.

Resin Solution 2

| | |
|---|---|
| Urethane resin composition (X-1) | 100 parts by mass |
| Isopropyl alcohol | 20 parts by mass |
| Toluene | 20 parts by mass |

Then, the nonwoven fabric and the electrolyte-swellable resin film 2 were put together and run through a nip roll to be attached to each other. Thereafter, after aging of the resultant film at 70° C. for 72 hours, the release paper was peeled out to obtain a separator for batteries. Properties of the obtained separator are shown in table 1.

Example 2

Except that 150 parts by mass of polyoxypropylene glycol (number average molecular weight: 1500) was used instead of 150 parts by mass of the polyoxyethylene glycol (number average molecular weight: 1500), the same process as that of Example 1 was used to obtain a urethane resin composition (X-2) having a nonvolatile content of 30 mass %. Except that the urethane resin composition (X-2) was used instead of the urethane resin composition (X-1) of Example 1, the same process as that of Example 1 was used to manufacture a separator. Properties of the obtained separator are shown in table 1.

Example 3

Except that 150 parts by mass of a copolymer of ethylene oxide and tetrahydrofuran (number average molecular weight: 1500) was used instead of 150 parts by mass of the polyoxyethylene glycol (number average molecular weight: 1500), the same process as that of Example 1 was used to obtain a urethane resin composition (X-3) having a nonvolatile content of 30 mass %. Except that this urethane resin composition (X-3) was used instead of the urethane resin composition (X-1) of Example 1, the same process as that of Example 1 was used to manufacture a separator. Properties of the obtained separator are shown in table 1.

Example 4

After (3) of Example 1, the following was performed as (4).

(4) Formation of Low Melting-Point Polymer Layer

First, an ethylene-vinyl alcohol copolymer (product of Kuraray Co., Ltd.: EVAL-G) having a melting point of 160° C. was added into a DMSO solvent, to achieve a concentration of 14 mass %, and was left still at 25° C. to be dissolved, to obtain a spinning liquid. Using the obtained spinning liquid, electrospinning was performed using a spinning machine.

In the spinning machine, a needle having an inner diameter of 0.9 mm was used as a spinneret, and the distance between the spinneret and a formation sheet take-up device was set to be 8 cm. Further, the sheet obtained in the (3) above was wound up onto the formation sheet take-up device. Then, while moving the formation sheet take-up device at a conveyer speed of 0.1 m/minute, the spinning liquid was extruded from the spinneret in a predetermined supply amount, with a voltage of 20 kV applied to the spinneret, such that a nanofiber having an average fiber diameter of 200 nm was deposited on a heat-resistant polymer layer to achieve a basis weight of 3.2 g/m$^2$.

A composite obtained in this manner was further subjected to heat pressing treatment at 130° C. to integrate the heat-resistant polymer layer and the low melting-point polymer layer. Properties of the obtained separator are shown in table 1.

Comparative Example 1

(1) Preparation of Urethane Resin Composition

Except that 150 parts by mass of polyester polyol (number average molecular weight: 1500) obtained by reacting adipic acid with 1,4-butanediol was used instead of 150 parts by mass of the polyoxyethylene glycol (number average molecular weight: 1500), the same process as that of Example 1 was used to obtain a comparative urethane resin composition (X'-1) having a nonvolatile content of 30 mass %. Except that this urethane resin composition (X'-1) was used instead of the urethane resin composition (X-1) of Example 1, the same process as that of Example 1 was used to manufacture a separator. Properties of the obtained separator are shown in table 2.

Comparative Example 2

Into a four-necked flask equipped with a thermometer, an agitator, a reflux condenser tube, and a nitrogen inlet tube was put 450 parts by mass of methyl ethyl ketone. Then, into this reaction vessel, 400 parts by mass of polyoxyethylene monomethyl ether methacrylate (number average molecular weight of polyoxyethylene chain: 1000) and 7 parts by mass of 3-mercapto-1,2-propanediol were supplied to react. Thus, a vinyl polymer (Y-1) having a number average molecular weight of 7000 and having two hydroxyl groups at one of the termini of the main chain, in which the ratio of its polyoxyethylene chains relative to the total amount of the vinyl polymer was 95 mass %, was obtained.

Then, in a vessel equipped with a thermometer, a nitrogen inlet tube, and an agitator, and purged with nitrogen, 50 parts by mass of the vinyl polymer (Y-1), 150 parts by mass of polyoxyethylene glycol (number average molecular weight: 1500), 15 parts by mass of 1,4-butanediol, and 100 parts by mass of 4,4' diphenylmethane diisocyanate were reacted for 4 hours in the presence of 300 parts by mass of methyl ethyl ketone as an organic solvent. Then, 200 parts by mass of methyl ethyl ketone was added thereto as a dilution solvent, and the reaction was allowed to continue.

When the weight average molecular weight of the reactant reached the range of 80000 to 120000, 3 parts by mass of methanol was added thereto to terminate the reaction. By further adding 175 parts by mass of methyl ethyl ketone as a dilution solvent, a comparative urethane resin composition (X'-2) having a nonvolatile content of 30 mass % containing a urethane resin, was obtained.

Then, except that this urethane resin composition (X'-2) was used instead of the urethane resin composition (X-1) of Example 1, the same process as that of Example 1 was used to manufacture a separator. Properties of the obtained separator are shown in table 2.

Comparative Example 3

Except that the above (2) of production of a base layer including a nonwoven fabric was omitted, the same process as that of Example 1 was used to manufacture a separator. Properties of the obtained separator are shown in table 2.

Comparative Example 4

Into a twin-screw extruder, 100 parts by mass of polyethylene (product of Mitsui Chemicals Inc.: 5202B) was supplied and fully melt-kneaded at 220° C. while pouring therein 120 parts by mass of liquid paraffin through an inlet provided in the cylinder of the twin-screw extruder, to prepare a polyethylene solution. The obtained polyethylene solution was extruded from a T-die attached at the tip of the twin-screw extruder into a sheet shape, and the resultant sheet was cooled. This sheet was set on a biaxial drawing machine, to be subjected to simultaneous biaxial drawing to be drawn by 7×7 times at 115° C. Then, the liquid paraffin was extracted by methyl ethyl ketone to obtain a polyethylene film having fine pores. Properties of the obtained film having fine pores are shown in table 2.

In Example 4 which comprises a low melting-point polymer layer, since the low melting-point polymer is capable of melting and forming a coating film when an abnormal heat generation occurs, the resistance after heating is 8.2 times the

TABLE 1

| | | | Example 1 | Example 2 | Example 3 | Example 4 |
|---|---|---|---|---|---|---|
| Electrolyte-swellable resin layer | A | Main polymer | PU(X-1) | PU(X-2) | PU(X-3) | PU(X-1) |
| | | Form | Complete film | Complete film | Complete film | Complete film |
| | | Basis weight [g/m²] | 14 | 14 | 14 | 14 |
| | B | Main polymer | PU(X-1) | PU(X-2) | PU(X-3) | PU(X-1) |
| | | Form | Complete film | Complete film | Complete film | Complete film |
| | | Basis weight [g/m²] | 14 | 14 | 14 | 14 |
| Nonwoven fabric layer (base material) | A | Main polymer | Cellulose | Cellulose | Cellulose | Cellulose |
| | | Melting temperature [° C.] | Infusible | Infusible | Infusible | Infusible |
| | | Form | Wet nonwoven fabric | Wet nonwoven fabric | Wet nonwoven fabric | Wet nonwoven fabric |
| | | Basis weight [g/m²] | 10 | 10 | 10 | 10 |
| | B | Polymer | | | | EVAL |
| | | Melting temperature [° C.] | | | | 160 |
| | | Form | | | | Electrospun nonwoven fabric |
| | | Basis weight [g/m²] | | | | 3 |
| Composite | | Basis weight [g/m²] | 38 | 38 | 38 | 41 |
| | | Thickness [μm] | 43 | 43 | 43 | 47 |
| | | Density [g/cm³] | 0.88 | 0.88 | 0.88 | 0.87 |
| | | Longitudinal strength [kg/15 mm] | 2.2 | 2.0 | 2.0 | 2.3 |
| | | Air permeability [seconds/100 cc] | Not lower than 5000 | Not lower than 5000 | Not lower than 5000 | Not lower than 5000 |
| | | Liquid absorption capacity[g/g] | 6.4(PU only 7.6) | 6.1(PU only 7.2) | 6.0(PU only 7.0) | 6.7 |
| | | Initial resistance [Ω] | 4.1 | 4.5 | 4.6 | 4.6 |

TABLE 2

| | | | Comparative Example 1 | Comparative Example 2 | Comparative Example 3 | Comparative Example 4 |
|---|---|---|---|---|---|---|
| Electrolyte-swellable resin layer | A | Main polymer | PU(X'-1) | PU(X'-2) | PU(X-1) | Polyethylene |
| | | Form | Complete film | Complete film | Complete film | Fine-porous film |
| | | Basis weight [g/m²] | 14 | 14 | 14 | 9 |
| | B | Main polymer | PUP(X'-1) | PU(X'-2) | PU(X-1) | |
| | | Form | Complete film | Complete film | Complete film | |
| | | Basis weight [g/m²] | 14 | 14 | 14 | |
| Nonwoven fabric layer (base material) | A | Main polymer | Cellulose | Cellulose | | |
| | | Melting temperature [° C.] | Infusible | Infusible | | |
| | | Form | Wet nonwoven fabric | Wet nonwoven fabric | | |
| | | Basis weight [g/m²] | 10 | 10 | | |
| | B | Polymer | | | | |
| | | Melting temperature [° C.] | | | | |
| | | Form | | | | |
| | | Basis weight [g/m²] | | | | |
| Composite | | Basis weight [g/m²] | 38 | 38 | 28 | 9 |
| | | Thickness [μm] | 43 | 43 | 28 | 20 |
| | | Density [g/cm³] | 0.88 | 0.88 | 1 | 0.43 |
| | | Longitudinal strength [kg/15 mm] | 2.3 | 2.3 | 0.53 | 7.1 |
| | | Air permeability [seconds/100 cc] | Not lower than 5000 | Not lower than 5000 | Not lower than 5000 | 156 |
| | | Liquid absorption capacity[g/g] | 4.1(PU only 4.5) | 5.2(PU only 6.0) | 7.9 | 4.5 |
| | | Initial resistance [Ω] | 7.2 | 5.9 | 2.1 | 5.8 |

Since each of the separators of Example 1 to 4 has a high ability to swell with the liquid electrolyte of urethane resin, and thus, has a low initial resistance, the separators have excellent properties as a separator for non-aqueous batteries with a high output. Further, since the separators of these Examples have high strength, they are excellent in handleability during manufacture. Further, the separators have high resisting properties against hydrogen fluoride, and the weights of the separators did not change at all against hydrogen fluoride (HF) generating from decomposition of the liquid electrolyte.

resistance before heating. This means good shutdown characteristics of the separator.

On the other hand, since the separator of Comparative Example 1 has a low ionic conductivity, the separator cannot be used as a separator for non-aqueous batteries.

The separator of Comparative Example 2 has a certain conductivity but has a reduced mechanical stability, and thus, the separator cannot be used as a separator for non-aqueous batteries.

The separator of Comparative Example 3 has a low strength, and thus is easy to be damaged. Thus, the separator has poor workability and cannot be used as a separator for non-aqueous batteries.

The film having fine pores of Comparative Example 4 has a high initial resistance. Accordingly, use of this film as a separator for non-aqueous batteries results in an increased internal resistance of the battery, and thus, a high output cannot be obtained. In addition, although the film has shutdown characteristics by self-melting, it does not keep a sheet shape if abnormal heat generation continues and raises the temperature. This may cause electrode materials to contact with each other, and thus may further increase danger. Such shutdown characteristics are not inadequate as a safeguard.

The separator for non-aqueous batteries of the present invention can be usefully employed in a non-aqueous battery.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A separator for non-aqueous batteries, the separator comprising:
   a base layer comprising a fiber aggregate; and
   an electrolyte-swellable resin layer formed on at least one surface of the base layer, such that the electrolyte-swellable resin layer and the base layer are integrated with each other,
   wherein:
   the electrolyte-swellable resin layer is capable of swelling in the presence of a liquid electrolyte and comprises a urethane resin (C);
   the urethane resin (C) is obtained by reacting a polyol (A) with a polyisocyanate (B);
   the polyol (A) comprises a vinyl polymer (a1) having a number average molecular weight of 2000 to 7000 and a polyether polyol (a2);
   the vinyl polymer (a1) comprising as a main chain a vinyl polymer (a1'), comprising two hydroxyl groups at one of the termini of the main chain, and a polyoxyethylene chain having a number average molecular weight of 200 to 800 as a side chain of the vinyl polymer (a1'); and
   a percentage of the polyoxyethylene chain based on the vinyl polymer (a1) is within a range of 70 mass % to 98 mass %.

2. The separator of claim 1, wherein the vinyl polymer (a1) is obtained by reacting a chain transfer agent (D), comprising two hydroxyl groups and one mercapto group, with a vinyl monomer (E) comprising a vinyl monomer (e) comprising a polyoxyethylene chain having a number average molecular weight of 200 to 800.

3. The separator of claim 1, wherein the electrolyte-swellable resin layer is substantially non-porous.

4. The separator of claim 1, wherein the base layer comprises a layer of a heat-resistant polymer formed from a heat infusible polymer or a high melting-point polymer having a melting point exceeding 200° C.

5. The separator of claim 4, wherein the heat-resistant polymer comprises at least one member selected from the group consisting of a fully aromatic polyamide polymer, a polyvinyl alcohol polymer, and a cellulose polymer.

6. The separator of claim 1, wherein the base layer comprises a nonwoven fabric.

7. The separator of claim 6, wherein the nonwoven fabric is at least one selected from the group consisting of a wet nonwoven fabric, a dry nonwoven fabric, a meltblown nonwoven fabric, a spun bond nonwoven fabric, an electrospun nonwoven fabric, and a nonwoven fabric laminate thereof.

8. The separator of claim 1, wherein the base layer comprises a laminate of a heat-resistant polymer layer and a low melting-point polymer layer of a low melting-point polymer having a melting point of 100 to 200° C.

9. The separator of claim 8, wherein the low melting-point polymer layer is a nonwoven fabric comprising a nanofiber having an average fiber diameter of not greater than 1000 nm.

10. The separator of claim 8, wherein the low melting-point polymer comprises at least one selected from the group consisting of a polyolefin polymer, an ethylene-vinyl alcohol copolymer, and a fluoropolymer.

11. A process for manufacturing a separator for non-aqueous batteries, the process comprising attaching a sheet or film to at least one surface of a base material comprising a fiber aggregate,
   wherein:
   the sheet or film is formed from a urethane resin (C) obtained by reacting a polyol (A) with a polyisocyanate (B);
   the polyol (A) comprises a vinyl polymer (a1) having a number average molecular weight of 2000 to 7000 and a polyether polyol (a2);
   the vinyl polymer (a1) comprises as a main chain a vinyl polymer (a1'), comprising two hydroxyl groups at one of the termini of the main chain, and a polyoxyethylene chain having a number average molecular weight of 200 to 800 as a side chain of the vinyl polymer (a1'); and
   a percentage of the polyoxyethylene chain based on the vinyl polymer (a1) is within a e range of 70 mass % to 98 mass.

12. A non-aqueous battery comprising the separator of claim 1.

13. The separator of claim 2, wherein the electrolyte-swellable resin layer is substantially non-porous.

14. The separator of claim 9, wherein the low melting-point polymer comprises at least one selected from the group consisting of a polyolefin polymer, an ethylene-vinyl alcohol copolymer, and a fluoropolymer.

* * * * *